H. W. BELL.
CLEANING ATTACHMENT FOR HARROWS.
APPLICATION FILED NOV. 10, 1916.
1,242,128.
Patented Oct. 9, 1917.
2 SHEETS—SHEET 1.
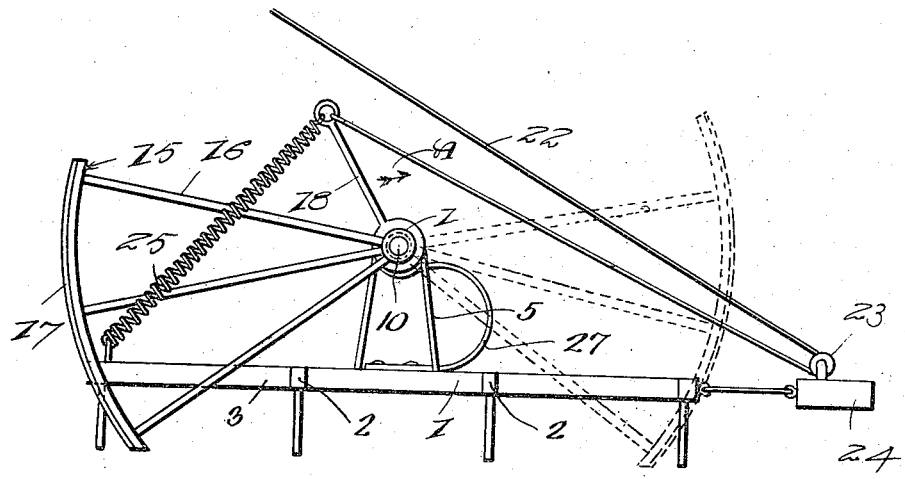
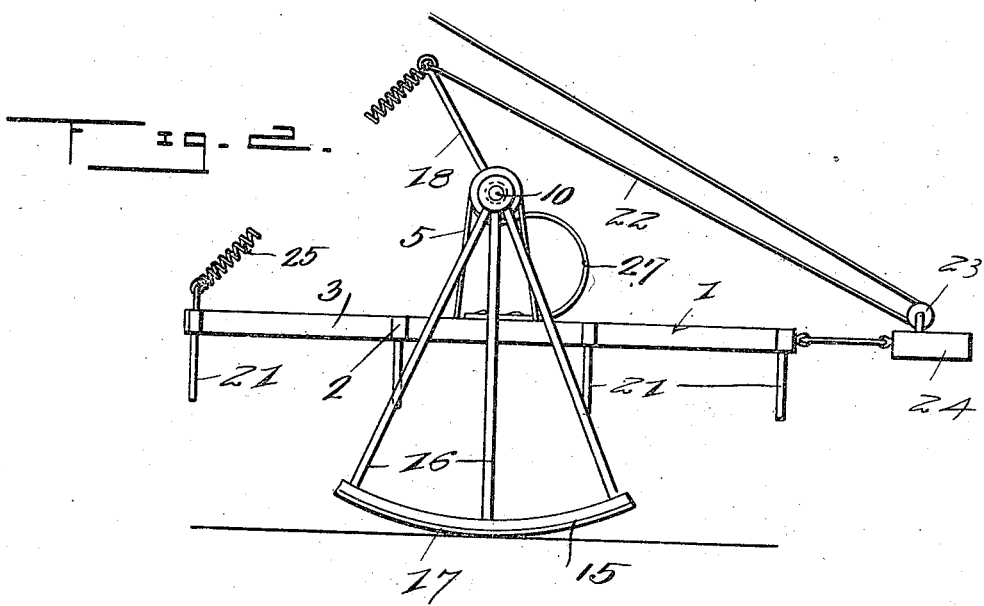

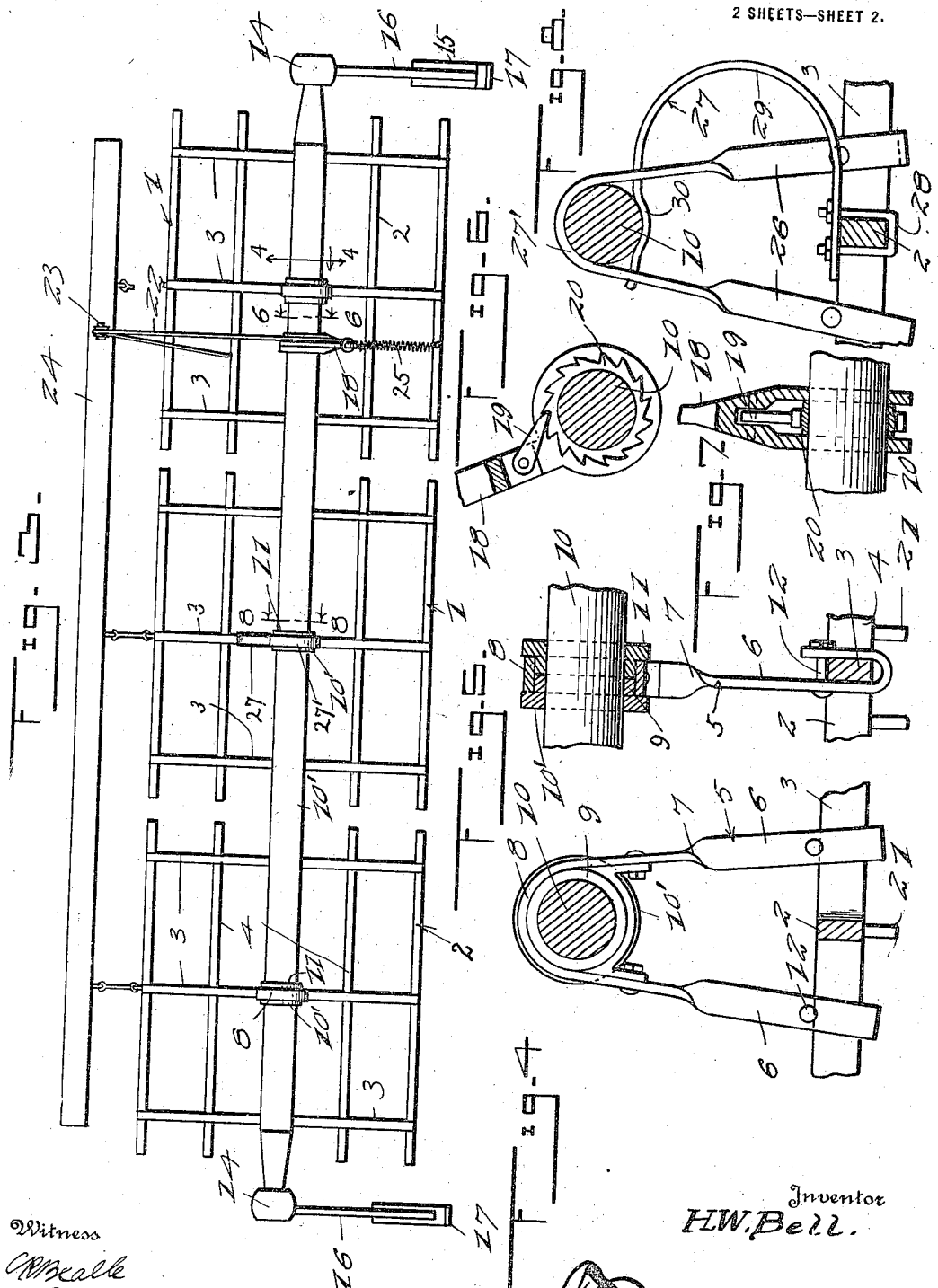

UNITED STATES PATENT OFFICE.

HAROLD W. BELL, OF BOYD, OREGON.

CLEANING ATTACHMENT FOR HARROWS.

1,242,128.   Specification of Letters Patent.   Patented Oct. 9, 1917.

Application filed November 10, 1916. Serial No. 130,576.

*To all whom it may concern:*

Be it known that I, HAROLD W. BELL, a citizen of the United States, residing at Boyd, in the county of Wasco and State of Oregon, have invented certain new and useful Improvements in Cleaning Attachments for Harrows; and I do hereby declare the following to be a full, clear, and exact description of the invention, such as will enable others skilled in the art to which it appertains to make and use the same.

This invention relates to an attachment for harrows, which is particularly designed for lifting the harrow off the ground, to permit weeds, corn stalks or other vegetation to fall off the teeth of the harrow.

An object of the invention is to provide a cleaning attachment as specified, which includes a shaft having a pair of segmental wheels attached to its end, and means for rotating the shaft for moving the rims of the segmental wheels into a ground engaging position for raising the harrow off the ground.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of a harrow showing the improved cleaning attachment connected thereto.

Fig. 2 is a side elevation of the harrow showing the cleaning attachment applied thereto and in a harrow raising position.

Fig. 3 is a plan view of a harrow showing the invention applied.

Fig. 4 is a section on the line 4—4 of Fig. 3.

Fig. 5 is a section through Fig. 4 taken at right angles to Fig. 4.

Fig. 6 is a section on the line 6—6 of Fig. 3.

Fig. 7 is a section through the lever and ratchet illustrated in Fig. 6, taken at right angles to the plane of Fig. 6, and Fig. 8 is a section on the line 8—8 of Fig. 3.

Referring more particularly to the drawings, 1 designates a harrow of ordinary construction, which may be made up of any desired number of sections, which harrow sections include the usual type of harrow carrying teeth bars 2 and brace bars 3 which extend transversely to the teeth carrying bars 2. A pair of bearing brackets are attached to the center braces 3 of the end harrow sections. The bearing structures 5 include straps 6, which have their lower ends attached to the brace bars 3, and which are twisted intermediate their upper and lower portions, as shown at 7. The bars 6 are substantially U-shaped, and the upper bight portions 8 thereof extend about collars 9 which are mounted upon a shaft 10'. The collars 9 are constructed of sections 10 and 11, which are flanged, as clearly shown in Fig. 5 of the drawings, between the flanges of which sections, the bight portions 8 of the straps 6 are positioned. The lower ends of the strap 6 are bent upwardly and about the braces 3, as clearly shown in Fig. 5 and are held securely connected thereto by means of bolts 12.

The shaft 10 extends longitudinally along all of the harrow sections, and it has hubs 14 mounted upon its outer ends, which hubs have segmental wheels 15 attached thereto. The segmental wheels 15 include a plurality of spokes 16 which radiate from the hubs 14 and rims 17 which are attached to the outer ends of the spokes.

A lever 18 is loosely mounted upon the shaft 10 and it has a pawl 19 carried thereby which coacts with a ratchet 20, that is keyed upon the shaft so that when the lever 18 is moved forwardly or in the direction indicated by the arrow A in Fig. 1 of the drawings, it will rotate the shaft 10 and move the segmental wheels 15 into the dotted line position indicated in Fig. 1 of the drawings. When the segmental wheels 15 are moved into the dotted line position as indicated in Fig. 1, the forward travel of their harrows will move these wheels into engagement with the ground, and they will raise the harrow structure 1 off the ground as clearly shown in Fig. 2 of the drawings, allowing weeds, corn stalks or other vegetable matter to fall off the teeth 21 of the harrow structure.

The cable or rope 22 is connected to the upper free end of the lever 18 and it passes about a pulley 23 which is rotatably supported by the draft evener 24, and rearwardly therefrom, so that a person walking behind the harrow can, by pulling upon the cable or rope 22 move the wheel segments 17 into the position indicated in dotted lines in Fig. 1. A spring 25 is connected to the lever 18 and to the harrow frame 1 for returning the lever 18 to its normal position, after it has been moved forwardly by the pulling on the rope or cable 22.

Intermediate of the brackets 5, is positioned a substantially U-shaped bracket 26, the legs of which are attached in any suitable manner to the central brace 3 of the central section of the harrow structure 1. The bight portion 27' of the substantially U-shaped strap extends over the shaft 10 as clearly shown in Fig. 8 of the drawings.

A flat spring 27 is attached to one of the harrow tooth carrying bars 2 of the central section of the harrow structure by the U-shaped bolts 28, and it is bowed, as clearly shown at 29, having its upper end curved as shown at 30 for fitting about the lower surface of the shaft 10 directly beneath the bight portion 27'. The bowed spring 27 is provided for supporting the intermediate portion of the shaft and so as to allow of limited movement of the harrow section independent of movement of the shaft, when traveling over rough and uneven surfaces.

From the foregoing description taken in connection with the accompanying drawings, the advantages of construction and of the method of operation of the improved cleaning attachment for harrows will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cleaning attachment for harrows, the combination with an ordinary sectional harrow, of a plurality of brackets carried by said harrow, collars carried by said brackets, a shaft rotatably supported by said collars and brackets, hubs formed upon the ends of said shaft, segmental wheels mounted upon said hubs, a lever loosely connected to said shaft, a ratchet carried by the shaft, a pawl carried by said lever and adapted for engagement with said ratchet for rotating said shaft upon forward movement of said lever, for moving said wheel segments into a land engaging position, for raising said harrow off the ground.

2. In a cleaning attachment for harrows, the combination with an ordinary sectional harrow, of a plurality of brackets carried by said harrow, collars carried by said brackets, a shaft rotatably supported by said collars and brackets, hubs formed upon the ends of said shaft, segmental wheels mounted upon said hubs, a lever loosely connected to said shaft, a ratchet carried by the shaft, a pawl carried by said lever and adapted for engagement with said ratchet for rotating said shaft upon forward movement of said lever, for moving said wheel segments into a land engaging position, for raising said harrow off the ground, and a spring connected to said lever and said harrow for returning said lever to its normal position.

3. In a cleaning attachment for harrows, the combination with an ordinary sectional harrow, of a plurality of brackets carried by said harrow, collars carried by said brackets, a shaft rotatably supported by said collars and brackets, hubs formed upon the ends of said shaft, segmental wheels mounted upon said hubs, a lever loosely connected to said shaft, a ratchet carried by the shaft, a pawl carried by said lever and adapted for engagement with said ratchet for rotating said shaft upon forward movement of said lever, for moving said wheel segments into a land engaging position, for raising said harrow off the ground, and a spring connected to said lever and said harrow for returning said lever to its normal position, a draft evener connected to said harrow, a pulley carried by said draft evener, a cable connected to said lever and passing about said pulley for operating the lever when the cable is pulled.

4. In a cleaning attachment for harrows, the combination with an ordinary sectional harrow, of a plurality of brackets carried by said harrow, collars carried by said brackets, a shaft rotatably supported by said collars and brackets, hubs formed upon the ends of said shaft, segmental wheels mounted upon said hubs, a lever loosely connected to said shaft, a ratchet carried by the shaft, a pawl carried by said lever and adapted for engagement with said ratchet for rotating said shaft upon forward movement of said lever, for moving said wheel segments into a land engaging position, for raising said harrow off the ground, and a spring connected to said lever and said harrow for returning said lever to its normal position, a draft evener connected to said harrow, a pulley carried by said draft evener, a cable connected to said lever and passing about said pulley for operating the lever when the cable is pulled, a bowed spring carried by one of said harrow sections and engaging the under surface of said shaft for supporting a portion of the weight of the shaft and permitting of a limited movement of the harrow section independent of the shaft.

In testimony whereof I affix my signature in presence of two witnesses.

HAROLD W. BELL.

Witnesses:
CELIA L. GAVIN,
DAISY O. TENNEY.

Copies of this patent may be obtained for five cents each, by addressing the "Commissioner of Patents, Washington, D. C."